United States Patent
Martin et al.

(10) Patent No.: US 10,484,043 B1
(45) Date of Patent: Nov. 19, 2019

(54) ADAPTIVE BLIND SOURCE SEPARATOR FOR ULTRA-WIDE BANDWIDTH SIGNAL TRACKING

(71) Applicant: HRL Laboratories, LLC, Malibu, CA (US)

(72) Inventors: Charles E. Martin, Thousand Oaks, CA (US); Shankar R. Rao, Agoura Hills, CA (US); Peter Petre, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 400 days.

(21) Appl. No.: 15/452,155

(22) Filed: Mar. 7, 2017

Related U.S. Application Data

(63) Continuation-in-part of application No. 15/073,626, filed on Mar. 17, 2016, now Pat. No. 9,749,007.

(60) Provisional application No. 62/304,623, filed on Mar. 7, 2016, provisional application No. 62/135,539, filed on Mar. 19, 2015.

(51) Int. Cl.
*H04B 1/719* (2011.01)

(52) U.S. Cl.
CPC .................... *H04B 1/719* (2013.01)

(58) Field of Classification Search
CPC ........................ H04B 1/719; H04B 1/71632
USPC .......................................... 375/350; 702/190
See application file for complete search history.

(56) References Cited

U.S. PATENT DOCUMENTS

| | | | |
|---|---|---|---|
| 5,694,474 A | 12/1997 | Ngo | |
| 8,031,117 B2 | 10/2011 | Goldberg | |
| 9,042,496 B1 | 5/2015 | Su | |
| 2005/0267377 A1 | 12/2005 | Marossero | |
| 2006/0069531 A1* | 3/2006 | Goldberg | H04B 7/0854 702/190 |
| 2012/0232418 A1 | 9/2012 | Kimura | |
| 2013/0304395 A1 | 11/2013 | Naidu | |
| 2014/0269850 A1* | 9/2014 | Abdelmonem | H04L 5/0026 375/148 |
| 2016/0203827 A1 | 7/2016 | Leff | |

OTHER PUBLICATIONS

S. Choi, A. Cichocki, H.-M. Park, and S.-Y. Lee, "Blind Source Separation and Independent Component Analysis: A Review," Neural Information Processing—Letters, vol. 6, No. 1, Jan. 2005, pp. 1-57.

(Continued)

*Primary Examiner* — Chieh M Fan
*Assistant Examiner* — Fitwi Y Hailegiorgis
(74) *Attorney, Agent, or Firm* — Tope-McKay & Associates

(57) ABSTRACT

Described is a system for adaptive blind source separation. A time-series of data points from one or more mixtures of source signals is continuously passed through adaptable filters, where each filter has a corresponding output signal. An error of each output signal is determined, and a filter state of each filter is determined using the error signals. A set of filter center frequencies are adapted using the set of error signals and the filter states, resulting in new filter center frequencies. The set of filter center frequencies are updated with the new filter center frequencies. Finally, separated source signals are extracted from the mixture of signals.

18 Claims, 11 Drawing Sheets
(3 of 11 Drawing Sheet(s) Filed in Color)

(56) References Cited

OTHER PUBLICATIONS

A. Cichocki and A. Belouchrani, "Sources separation of temporally correlated sources from noisy data using a bank of band-pass filters," in Proc. of Independent Component Analysis and Signal Separation (ICA-2001), pp. 173-178, San Diego, USA, Dec. 9-13, 2001.

A. Hyvarinen, "Complexity Pursuit: Separating Interesting Components from Time Series," Neural Computation, vol. 13, No. 4, pp. 883-898, Apr. 2001.

Igel, C. and Husken, M., "Improving the Rprop learning algorithm", in Proc. of the 2nd Int. Symposium on Neural Computation (NC'2000), pp. 115-121, ICSC Academic Press, 2000.

R. H. Walden, "Analog-to-digital converter survey and analysis," IEEE J. Sel. Areas Commun., vol. 51, pp. 539-548, 1999.

H. Jaeger, et al. "Harnessing nonlinearity: Predicting chaotic systems and saving energy in wireless communications," Science, vol. 304, No. 5667, pp. 78-80, 2004.

R. Legenstein, et al. "Edge of Chaos and Prediction of Computational Performance for Neural Microcircuit Models," Neural Networks 20 (3), pp. 323-334, 2007.

W. Maass, "Liquid Computing", Proc. of the Conference CiE'07: Computability in Europe 2007, Siena (Italy), pp. 507-516.

F. Takens, "Detecting Strange Attractors in Turbulence," Dynamical Systems and Turbulence, Lecture Notes in Mathematics vol. 898, 1981, pp. 366-381.

D. Verstraeten, et al. "An experimental unification of reservoir computing methods", Neural Networks, vol. 20, No. 3, Apr. 2007, pp. 391-403.

R. Walden, "Analog-to-digital converter survey and analysis," IEEE J. Sel. Areas Commun., vol. 51, pp. 539-548, 1999.

H. Yap, et al., "A First Analysis of the Stability of Takens' Embedding," in Proc. of the IEEE Global Conference on Signal and Information Processing (GlobalSIP) symposium on Information Processing for Big Data, Dec. 2014, pp. 404-408.

Office Action 1 for U.S. Appl. No. 15/452,412, dated May 10, 2017.

Office Action 1 for U.S. Appl. No. 15/073,626, dated Sep. 16, 2016.

Response to Office Action 1 for U.S. Appl. No. 15/073,626, dated Dec. 16, 2016.

Notice of Allowance for U.S. Appl. No. 15/073,626, dated Apr. 25, 2017.

* cited by examiner

| Parameter | Value |
|---|---|
| Input signal sampling rate | 180GHz |
| Bessel filter order | 2 |
| Gain factor at output of filters | 25 |
| Enforced minimum filter center frequency | 0.1GHz |
| Bessel filter bandwidth | 0.01GHz |
| Modification to center frequency for approximating gradient | 1e-5 (Stochastic Gradient Descent), 1e-4 (RProp) |
| Number of past filter outputs used to compute error | 1000 |
| fitLimit | 3000 filter outputs |
| Closest that new center frequency suggested by Gradient Descent or Randomized Search can be to any old center frequency of other filters | 5GHz |
| Standard deviation used for Gaussian in Randomized Search | 0.55GHz |
| Number of candidate center frequencies randomly sampled each time-step for Randomized Search | 4 |
| Number of samples of mixture signal per input time-window | 1000 |
| Number of samples to increment time-window each cycle of processing | 10 |
| minSignalCout | 18 filter outputs |
| maxHoldCount | 450 filter outputs |
| noiseThreshold | -0.02 |
| RProp Parameters | --- |
| Maximum step-size | 1 |
| Minimum step-size | 1e-10 |
| Step-size increase factor | 1.1 |
| Step-size decrease factor | 0.5 |

FIG. 6

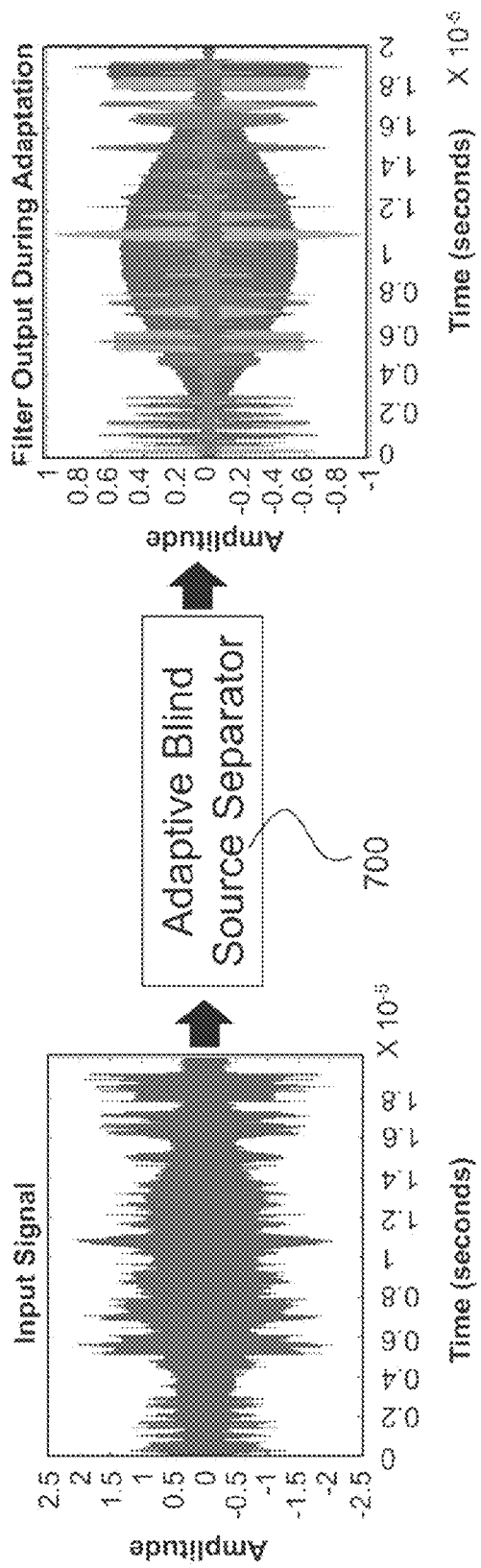

ADAPTIVE BLIND SOURCE SEPARATOR FOR ULTRA-WIDE BANDWIDTH SIGNAL TRACKING

CROSS-REFERENCE TO RELATED APPLICATIONS

This is a Continuation-in-Part of U.S. application Ser. No. 15/073,626, filed in the United States on Mar. 17, 2016, entitled, "Cognitive Blind Source Separator," which is a Non-Provisional Application of U.S. Provisional Application No. 62/135,539, filed in the United States on Mar. 19, 2015, entitled, "Cognitive Blind Source Separator," the entirety of which are incorporated herein by reference.

This is also a Non-Provisional Application of U.S. Provisional Application No. 62/304,623, filed in the United States on Mar. 7, 2016, entitled, "Cognitive Architecture for Wideband, Low-Power, Real-Time Signal Denoising," the entirety of which is incorporated herein by reference.

STATEMENT REGARDING FEDERALLY SPONSORED RESEARCH OR DEVELOPMENT

This invention was made with government support under U.S. Government Contract Number N00014-12-C-0027. The government has certain rights in the invention.

BACKGROUND OF INVENTION (1) Field of Invention

The present invention relates to a system for blind source separation and, more particularly, to a system for blind source separation with low complexity and memory requirements.

(2) Description of Related Art

State-of-the-art systems for detecting, localizing, and classifying source emitters from passive radio frequency (RF) antennas over an ultra-wide bandwidth (>30 Gigahertz (Gz)) require high rate analog-to-digital converters (ADC). Such high-rate ADCs are expensive and power hungry, and due to fundamental physical limits (such as the Walden curve described in Literature Reference No. 5 in the List of Incorporated Literature References), are not capable of achieving the sampling rate needed to capture the ultra-wide bandwidth. To mitigate this, current electronic support measures (ESM) systems use either spectrum sweeping (which is too slow to handle agile emitters) or a suite of digital channelizers, which have large size, weight, and power requirements. In addition, the detection, localization, and classification algorithm that ESM systems use are typically based on the fast Fourier transform, with high computational complexity and memory requirements that make it difficult to operate them in real-time over an ultra-wide bandwidth.

Conventional methods for blind source separation (BSS) typically require a greater number of input mixtures (which maps directly to a greater number of antenna) than the number of source signals, limiting their applicability in size, weight, and power (SWaP)-constrained scenarios (see Literature Reference No. 1). Some extensions to conventional BSS have addressed the "underdetermined" scenario (with fewer mixtures than sources) that leverage prior knowledge about the sources, such as having "low complexity" or having a sparse representation with respect to a learned dictionary. Such models of prior knowledge are too broad, enabling the system to overfit an entire mixture as a single source, and require large amounts of memory to store the dictionary and computation to recover the presentation of the input mixtures with respect to the dictionary (see Literature Reference Nos. 1 and 3).

In Literature Reference No. 2, the authors coupled the BSS algorithm with an infinite impulse response (IIR) bandpass filter with tunable center frequency in order to separate temporally correlated sources. Their work is limited, requiring at least as many mixtures as sources, requiring that the mixtures be "prewhitened" to have an identity-valued covariance matrix, and using the second-order statistics of sources as the sole cue for separation.

Thus, a continuing need exists for a system to separate multiple temporally correlated source signals over an ultra-wide bandwidth using as little as a single antenna.

SUMMARY OF INVENTION

The present invention relates to a system for blind source separation and, more particularly, to a system for blind source separation with low complexity and memory requirements. The system comprises one or more processors and a memory having instructions such that when the instructions are executed, the one or more processors perform multiple operations. A time-series of data points from one or more mixtures of source signals is continuously passed through a plurality of adaptable filters having center frequencies, resulting in a plurality of output signals, each filter in the plurality of adaptable filters having a corresponding output signal. An error of each output signal is determined resulting in a set of error signals. A filter state of each filter is determined using the error signals, resulting in a set of filter states. A set of filter center frequencies are adapted with a filter center frequency adapter using the set of error signals and the set of filter states, resulting in new filter center frequencies. The set of filter center frequencies are updated with the new filter center frequencies. Separated source signals are extracted from the mixture of signals.

In another aspect, the plurality of filters are low-order adaptable infinite impulse (IIR) filters.

In another aspect, the error is a negative power of the output signal, and wherein the separated source signals are extracted by minimizing the negative power of each filter's output signal.

In another aspect, as the one or more mixtures of source signals is passed through each filter, each filter adapts such that its filter center frequency converges on a filter center frequency of a separated source signal.

In another aspect, the filter center frequency adapter prevents more than one filter from extracting any given source signal at the same time.

In another aspect, the filter center frequency adapter integrates a plurality of adaptation methods that operate together or alone to select new filter center frequencies, wherein an adaptation method in the plurality of adaptation methods is selected based on a filter's state.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The file of this patent or patent application publication contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where:

FIG. 6 is a table illustrating parameters and common values according to some embodiments of the present disclosure;

FIG. 7A is an illustration of a mixture signal with 12 decibels (dB) signal-to-noise ratio (SNR) which is input to the blind source separation system according to some embodiments of the present disclosure;

Figure 8:
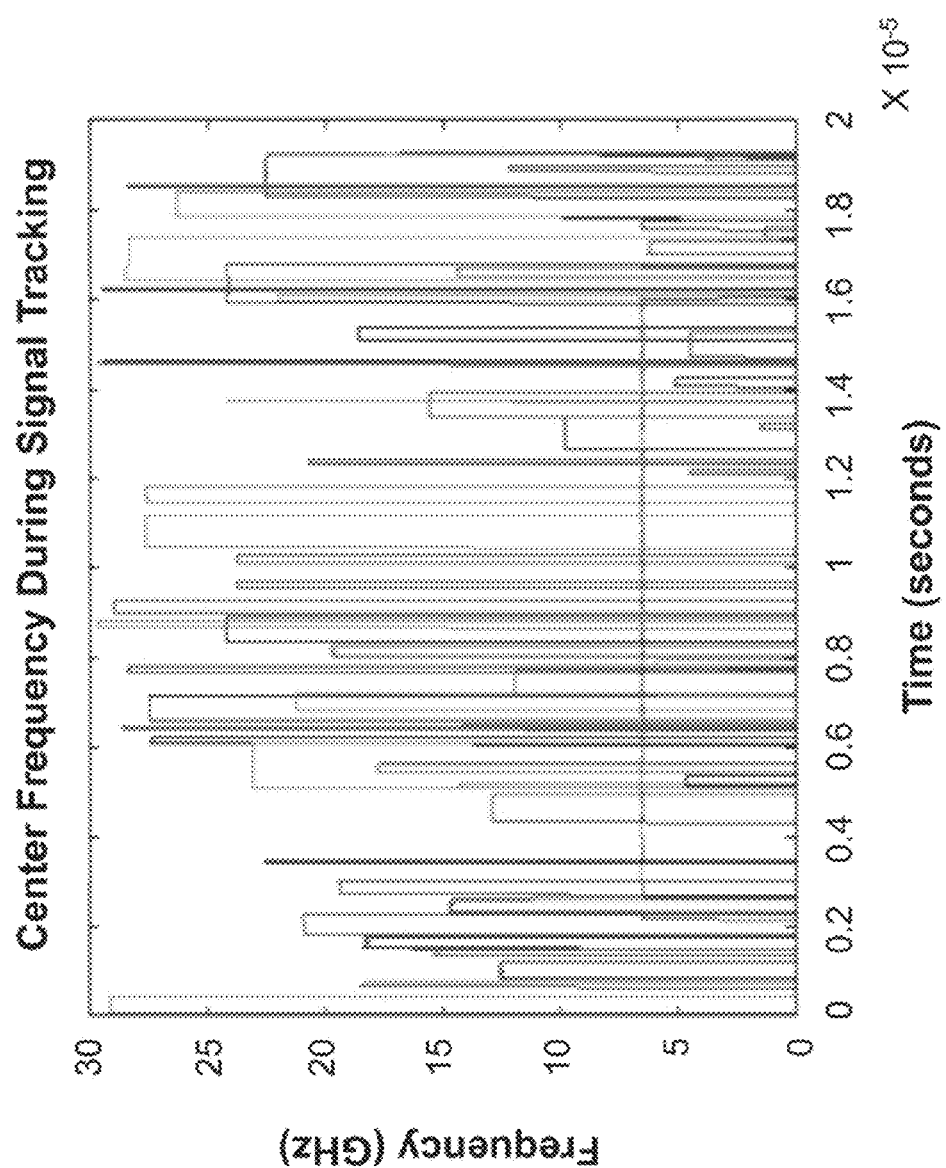
Figure 9:
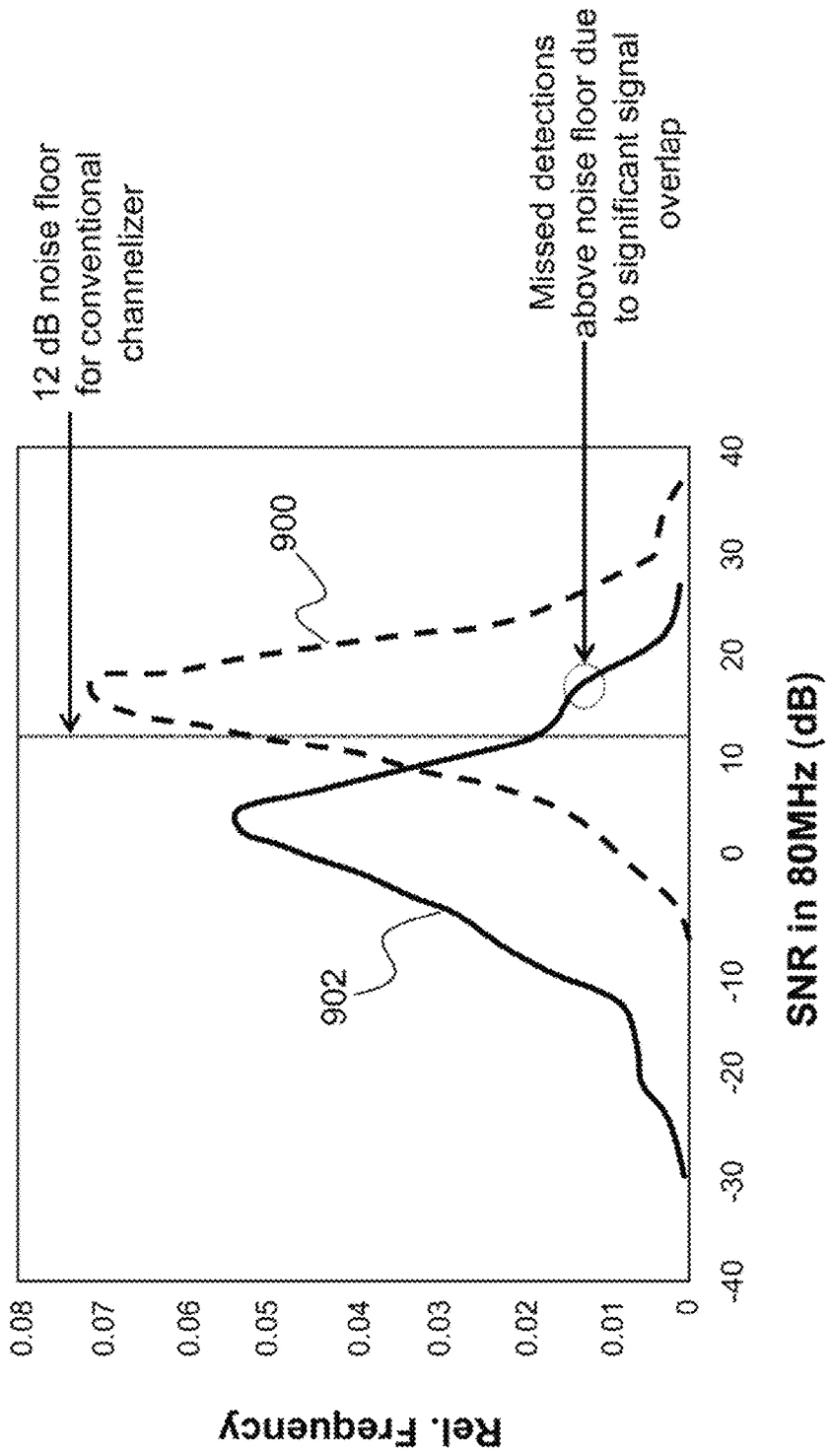
Figure 10:
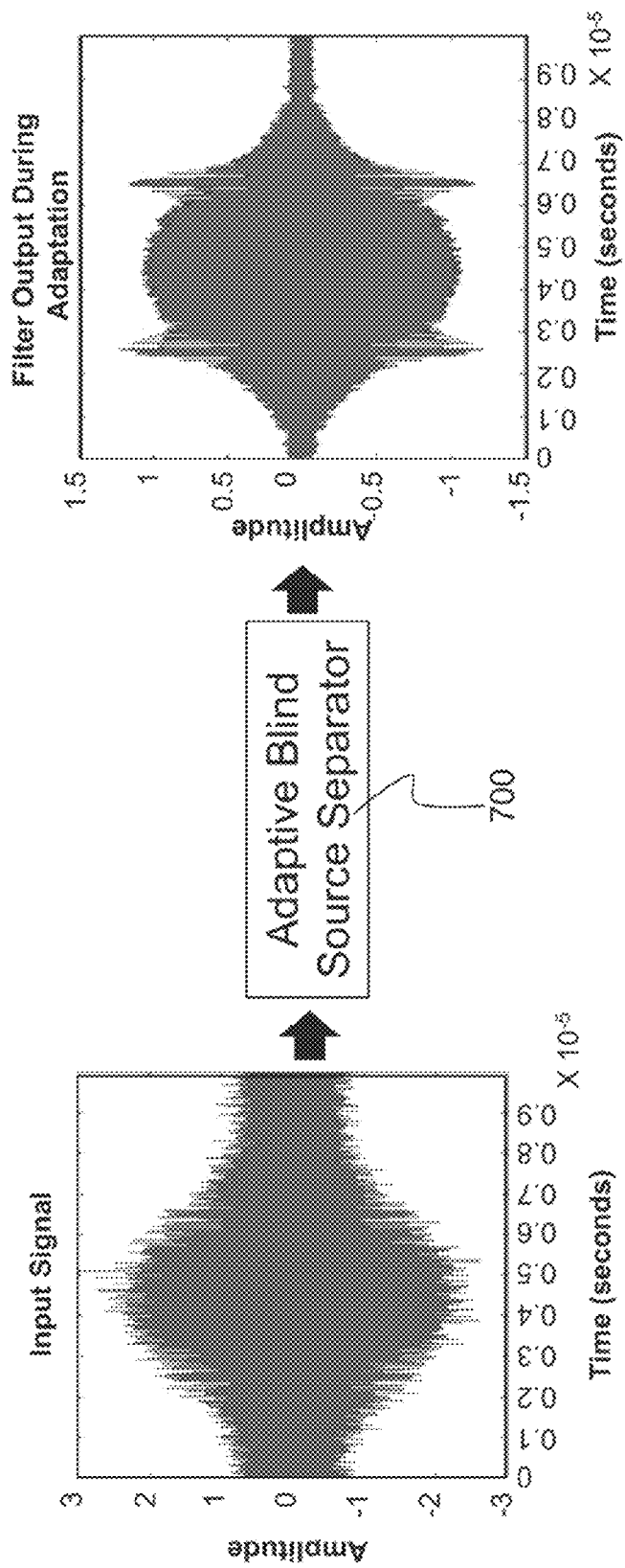
Figure 11:
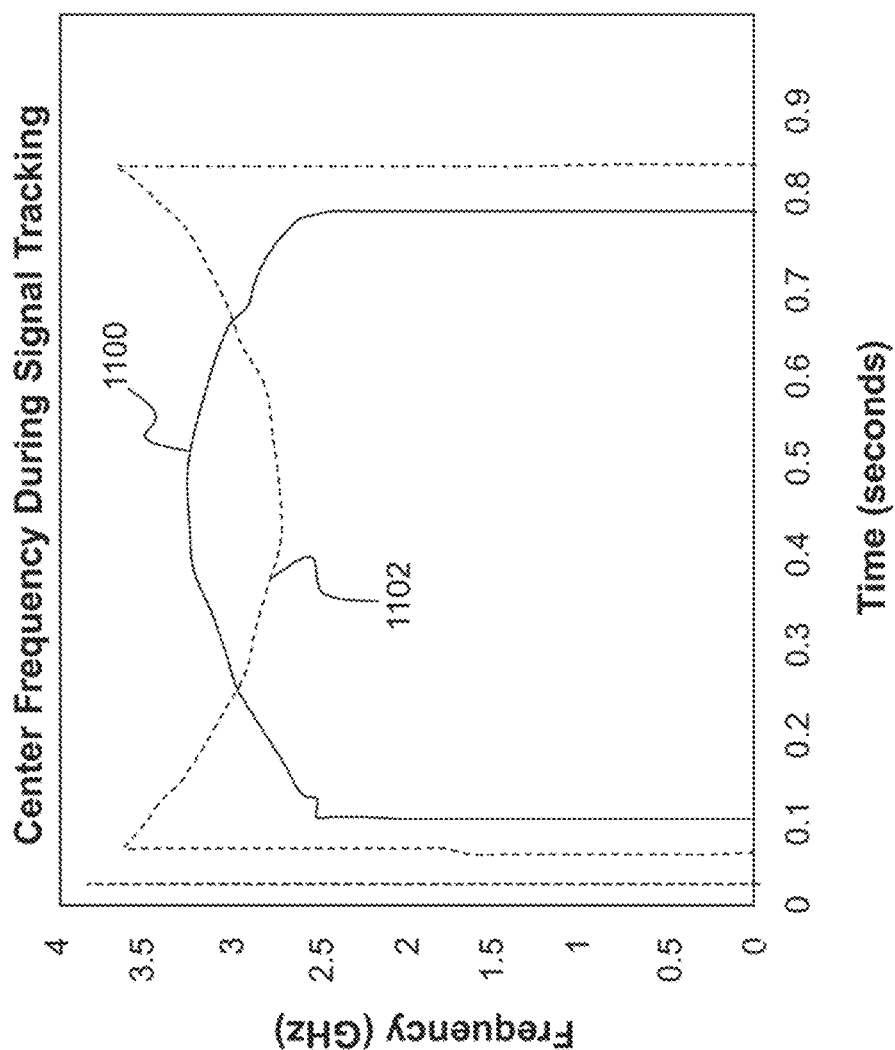

FIB. 7B is an illustration of signals extracted, by the blind source separation system, from the mixture signal of FIG. 7A according to some embodiments of the present disclosure;

FIG. 8 is an illustration of center frequencies of the filters during signal tracking according to some embodiments of the present disclosure;

FIG. 9 is an illustration of the signal tracking capabilities of the system according to some embodiments of the present disclosure;

FIG. 10A is an illustration of a mixture signal with 12 dB SNR containing two parabolic chirps which is input to the blind source separation system according to some embodiments of the present disclosure;

FIG. 10B is an illustration of parabolic chirps extracted, by the blind source separation system, from the mixture signal of FIG. 10A according to some embodiments of the present disclosure; and FIG. 11 is an illustration of center frequencies of the filters during signal tracking according to some embodiments of the present disclosure.

DETAILED DESCRIPTION

The present invention relates to a system for blind source separation and, more particularly, to a system for blind source separation with low complexity and memory requirements. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number as follows:

1. S. Choi, A. Cichocki, H.-M. Park, and S.-Y. Lee, "Blind Source Separation and Independent Component Analysis: A Review," Neural Information Processing—Letters, Vol. 6, No. 1, January 2005.
2. A. Cichocki and A. Belouchrani, "Sources separation of temporally correlated sources from noisy data using a bank of band-pass filters," in Proc. of Independent Component Analysis and Signal Separation (ICA-2001), pp. 173-178, San Diego, USA, Dec. 9-13, 2001.
3. A. Hyvarinen, "Complexity Pursuit: Separating Interesting Components from Time Series," Neural Computation, Vol. 13, No. 4, pp. 883-898, April 2001.
4. Igel, C. and Husken, M., "Improving the Rprop learning algorithm", in Proc. of the $2^{nd}$ Int. Symposium on Neural Computation (NC'2000), pp. 115-121, ICSC Academic Press, 2000.
5. R. H. Walden, "Analog-to-digital converter survey and analysis," IEEE J. Sel. Areas Commun., vol. 51, pp. 539-548, 1999.

(2) PRINCIPAL ASPECTS

Various embodiments of the invention include three "principal" aspects. The first is a blind source separator system. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
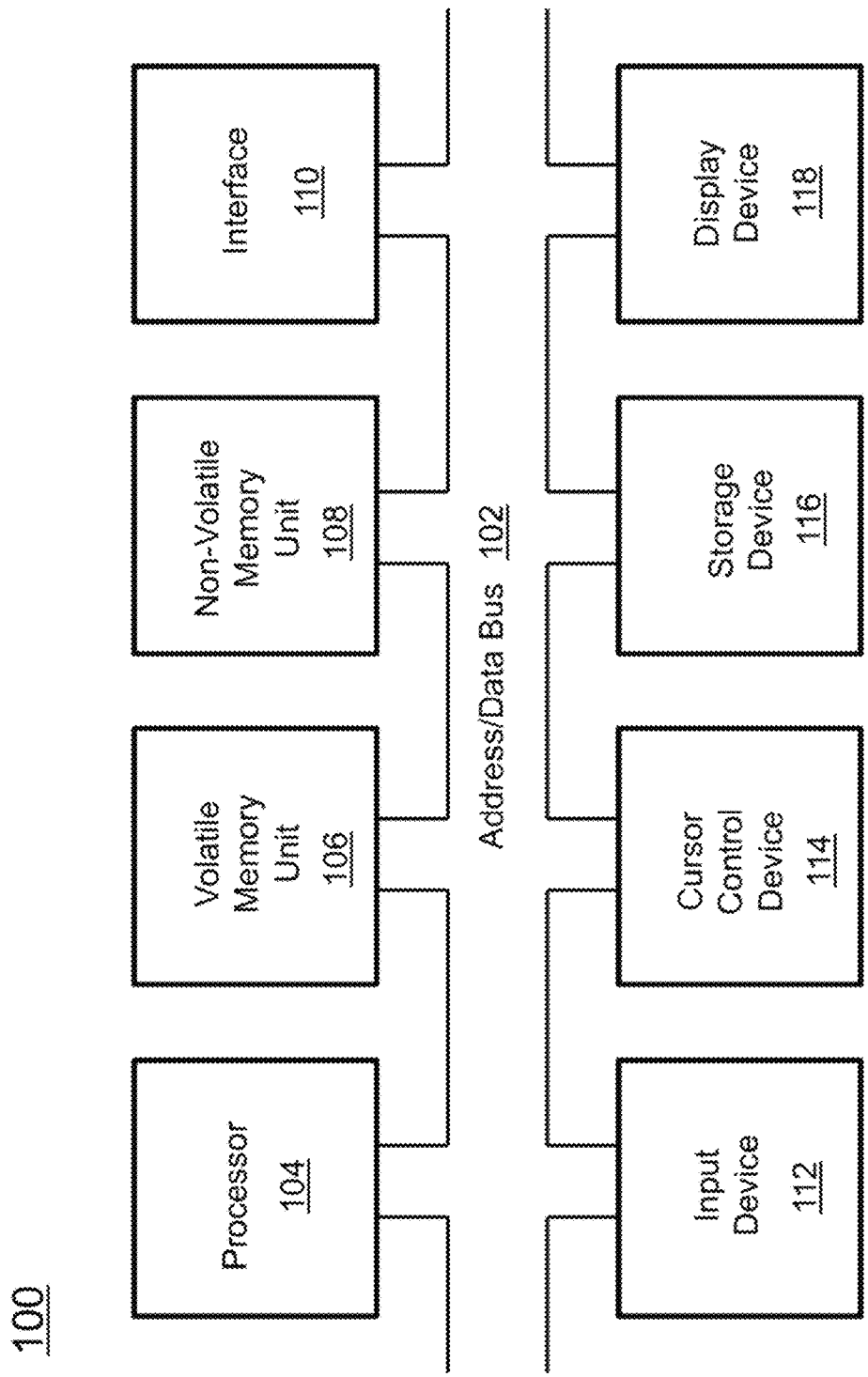
FIG. 1 is a block diagram depicting the components of a blind source separator system according to some embodiments of the present disclosure.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
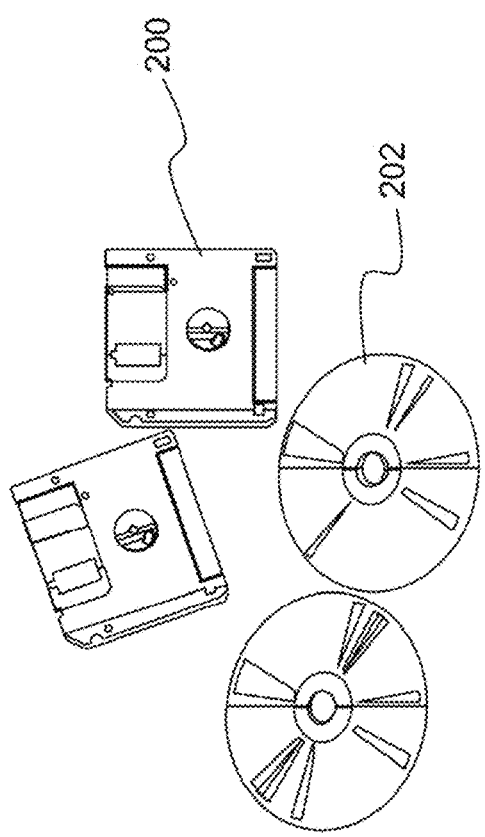
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF VARIOUS EMBODIMENTS OF THE INVENTION

Described is a machine learning inspired method of blind source separation (BSS) referred to as the Adaptive Blind Source Separator (ABSS). It is designed to address the BSS problem, in which many different signals are linearly mixed by one or more antennas, and the objective is to extract the original source signals from the mixture(s) by imposing some limited constraints on the attributes of the extracted signals. Common constraints include complexity, linear predictability, and non-Gaussianity.

Figure 3:
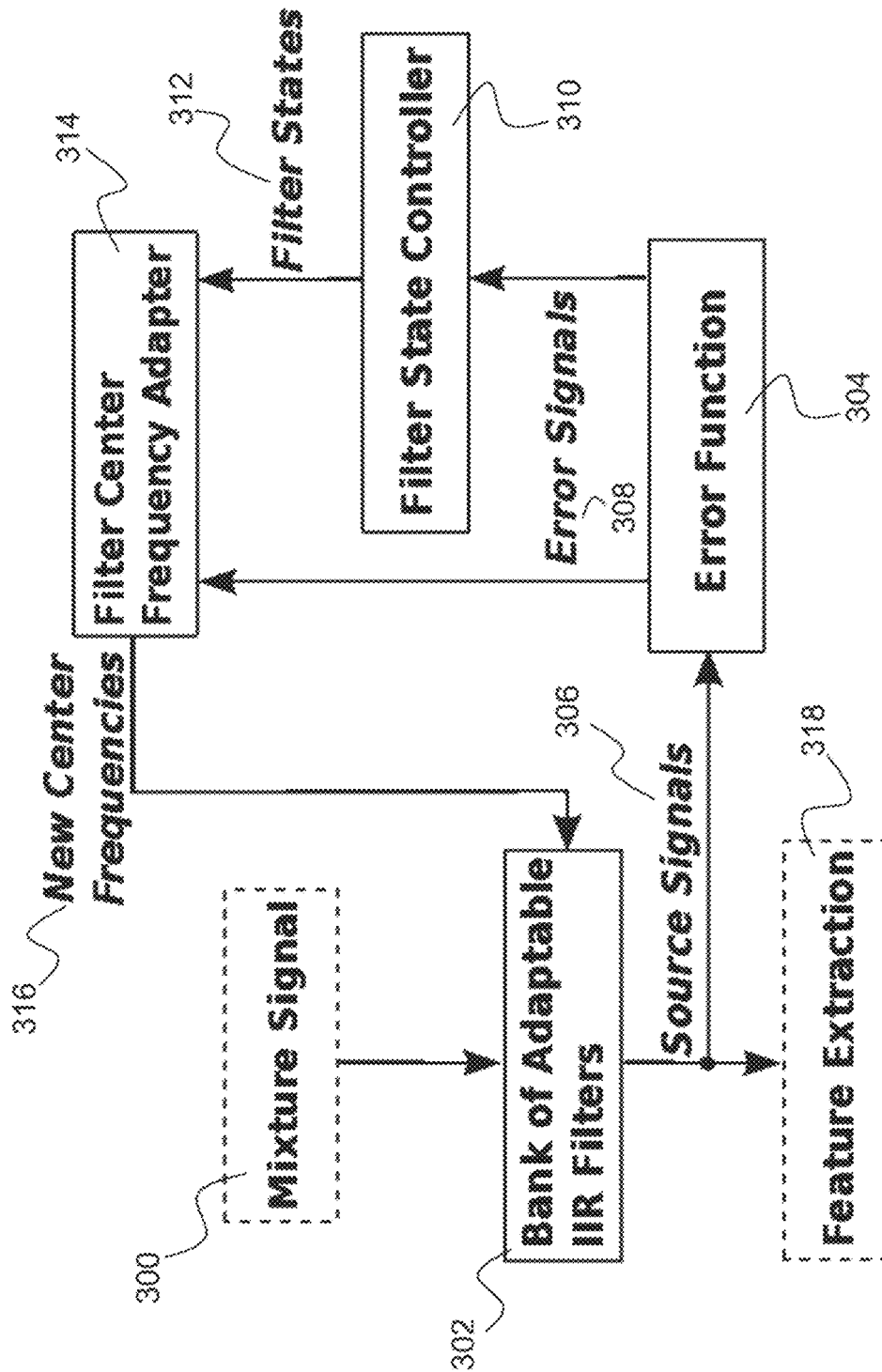
FIG. 3 is an illustration of a systematic overview of a system for blind source separation according to some embodiments of the present disclosure.

The Adaptive Blind Source Separator consists of four primary components depicted in FIG. 3. The first component is a bank of adaptable infinite impulse response (IIR) filters. The mixture signals that form the input to the system according to embodiments of the present disclosure are continuously passed through the adaptable filters. The second component is an error function, which computes its output based on the output of the filters (i.e., source signals) and is used to define the quality of the filter outputs (i.e., source signals). The third component is a filter state controller responsible for modifying the filter states of the filters. The filter state controller accepts output (i.e., error signals) from the error function as input. The final component is a controller referred to as the filter center frequency adapter that adapts the center frequencies of the filters based on the output of the error function and the filter states with new center frequencies. These four components operate in a feedback loop that drives the filters to hone in on the frequencies of source signals present in the input (mixture signal), thereby extracting the component source signals. The filter bandwidths are set in advance and do not change. The outputs from the adaptable filters are the original source signals, which represent the final output of the system according to embodiments of the present disclosure.

There are several unique aspects of the ABSS. First, the ABSS uses low-order adaptable IIR filters, such as $2^{nd}$ order Bessel filters, which provide high frequency resolution, low computational complexity, and a smooth frequency gain response. Second, the system described herein combines methods from IIR filter theory with machine learning in order to achieve fast and robust source signal detection and tracking over ultra-wide bandwidths. In particular, the ABSS utilizes filters with unimodal frequency responses and adapts their center frequencies using a combination of gradient-descent and gradient-free optimization based on a randomized search algorithm. Third, the adaptation scheme employed by the invention described herein incorporates an explicit mechanism that limits how close different filters can approach one another in the frequency domain, which is used to ensure that each filter extracts a unique signal. Fourth, the system employs filter states, which give the adapting filters distinct state-dependent properties. The aforementioned properties provide desirable characteristics, such as having each filter extract a unique source signal. Fifth, the ABSS incorporates a dynamic phenomenon that is analogous to momentum and allows filters to track signals through repeated collision with other signals in the time-frequency domain.

In the Blind Source Separation problem any single antenna measures multiple source signals. There may be more than one antenna measuring the signals, but in general each antenna "sees" all of the source signals and creates a different linear mixture of them. The task is then to use the measured mixture signals in order to recover the original source signals. The case of a single antenna operating in isolation is especially challenging because there is no sense of spatial resolution to aid in the extraction process. The invention described herein is capable of robustly handling this challenging and common scenario.

The system according to embodiments of the present disclosure exhibits several advantages in challenging BSS scenarios relative to current state-of-the-art methods. First, because the ABSS performs adaptive filtering, its hardware-based embodiment requires much less weight and power than current brute-force channelization methods. The use of computationally efficient low-order IIR filters further enhances the SWaP (Size, Weight, and Power) characteristics of the invention described herein. One embodiment utilizes $2^{nd}$ order Bessel filters, which are computationally efficient to run and adapt, and provide high resolution in the frequency domain with a smooth frequency gain response.

Second, owing to the unique filter adaptation mechanism that fuses gradient descent and randomized search, it can cover an ultra-wide bandwidth of over 80 GHz while employing very narrow bandwidth filters with high frequency resolution, and yet still exhibit very low signal detection latencies on the order of 0.1 nanoseconds. Third, it can simultaneously extract large numbers of noisy source signals that have been linearly mixed by a single antenna. That is, in order to be effective, the ABSS does not require a multi-antenna array or a large bank of fixed pre-defined filters, which is needed by many other methods for BSS.

Fourth, the system according to embodiments of the present disclosure is capable of extracting signals in real-time using a constraint that covers a wide range of electromagnetic and acoustic signals of interest. Many other current approaches use powerful, but computationally expensive constraints, such as signal complexity measures, or rely on loose constraints, which may be computationally inexpensive but have limited capacity to capture the structure of real-world source signals. In contrast, the system described herein utilizes the constraint that a source signal is adequately described by a single tone over any short interval of time, which can be computed quickly with limited computational cost.

Fifth, due to the incorporation of state-dependent filter behavior, the invention is able to track source signals continuously, even if the signal is momentarily lost, as well as reducing the incidence of false alarms. Furthermore, each filter extracts a unique source single, thus avoiding the extraction of confounding and unnecessary duplicates. Sixth, thanks to a unique Momentum component, which has low memory and computational requirements, the filters are able to track multiple signals through repeated collisions in the time-frequency domain. This is a scenario that very few state-of-the-art blind source separation methods can handle. Each of these aspects are described in further detail below.

(3.1) System and Methods for the Adaptive Blind Source Separator

A systematic representation of the system according to embodiments of the present disclosure is shown in FIG. 3. The input to the invention is a time-series of data points that are samples from one or more mixtures of source signals, a mixture signal 300. The time-series is fed directly into a bank of adaptable IIR filters 302. The error of the output signal generated by each filter is computed via an error function 304 to determine the quality of the filter outputs. The error is defined as the negative power of the signal. The system causes the filters 302 to extract unique source signals 306 by minimizing the negative power (i.e., maximizing the power) of each filter output signal. The error signals 306 are fed into the Filter State Controller 310 to update the filter states 312. The Filter Center Frequency Adapter 314 accepts the error signals 308 and filter states 312 as input and uses this information to update the filter center frequencies (i.e., adjust the filter center frequencies). The center frequencies of the filters are updated with the new center frequencies 316 completing an open feedback loop, resulting in the filters 302 tracking the source signals 306. As the system operates, the source signals 306 are extracted and features, such as Pulse Descriptor Words (PDWs), may then be extracted from the separated source signals via feature extraction 318.

(3.2) Bank of Adaptable IIR Filters (Element 302)

The first stage of the Adaptive Blind Source Separator is a set of adaptable IIR filters 302. The only constraint on the type of filter is that it must have a unimodal gain response in the frequency domain, though ripple is acceptable. Bessel filters are an example of an acceptable IIR filter type. Each filter in the bank of adaptable IIR filters 302 receives the mixture signal 300 as input.

The center frequency of each filter is adaptable, while its bandwidth is fixed. As a mixture signal 300 is run through the filters 302, each one adapts in such a way that its center frequency converges on the frequency of a unique source signal 306. The frequency of a source signal 306 may be a function of time. The invention described herein only requires that a source signal 306 be well characterized by a single frequency over any short interval of time.

(3.3) Error Function (Element 304)

The error function 304 is a feedback component of the system according to embodiments of the present disclosure and is partially responsible for guiding the adaptation of the filter center frequencies (i.e., new center frequencies 316). Conceptually, each filter may be viewed as having its own error function 304, with all individual error functions 304 having the same form. The error is the negative power of the corresponding filter's output. The negative power is computed as $$-\frac{1}{M}\sum_{i=0}^{M-1} y(t-i)^2,$$

where $y(t)$ is the output from the filter at time t and M is the number of samples used in the average. The objective is to minimize the negative power (maximize the power), which tends to drive the filter's center frequency towards one of the source signal 306 frequencies. The adaptation for this objective occurs on a fast time-scale in order to cover a very wide bandwidth. The output of the error function 304 is the error signal 308. The error signal 308 is used to adapt the filter center frequencies and determine the filter states 312. The error signal 308 is defined as the normalized negative power of the filter output. The normalized negative power is given by:

$$-\left[\frac{1}{M}\sum_{i=0}^{M-1} y(t-i)^2\right] / \text{var}(x(t)),$$

where $y(t)$ is the output from the filter at time t, M is the number of samples used in the average, $x(t)$ is the input to the filter, and $\text{var}(x(t))$ is the variance in the input computed over the same M samples.

(3.4) Filter State Controller (Element 310)

The Filter State Controller 310 is responsible for determining the current state of each filter (filter states 312). Filters exist in one of three possible states: searching, tracking, and holding. A filter is in the searching state when it has not yet found a source signal to extract. A filter is in the tracking state while it is actively extracting a source signal. A filter is in the holding state when it was in the process of extracting a source signal, but lost the signal. The following state transitions are permitted: searching→searching, searching→tracking, tracking→tracking, tracking→holding, holding→holding, holding→tracking, holding→searching.

Figure 4:
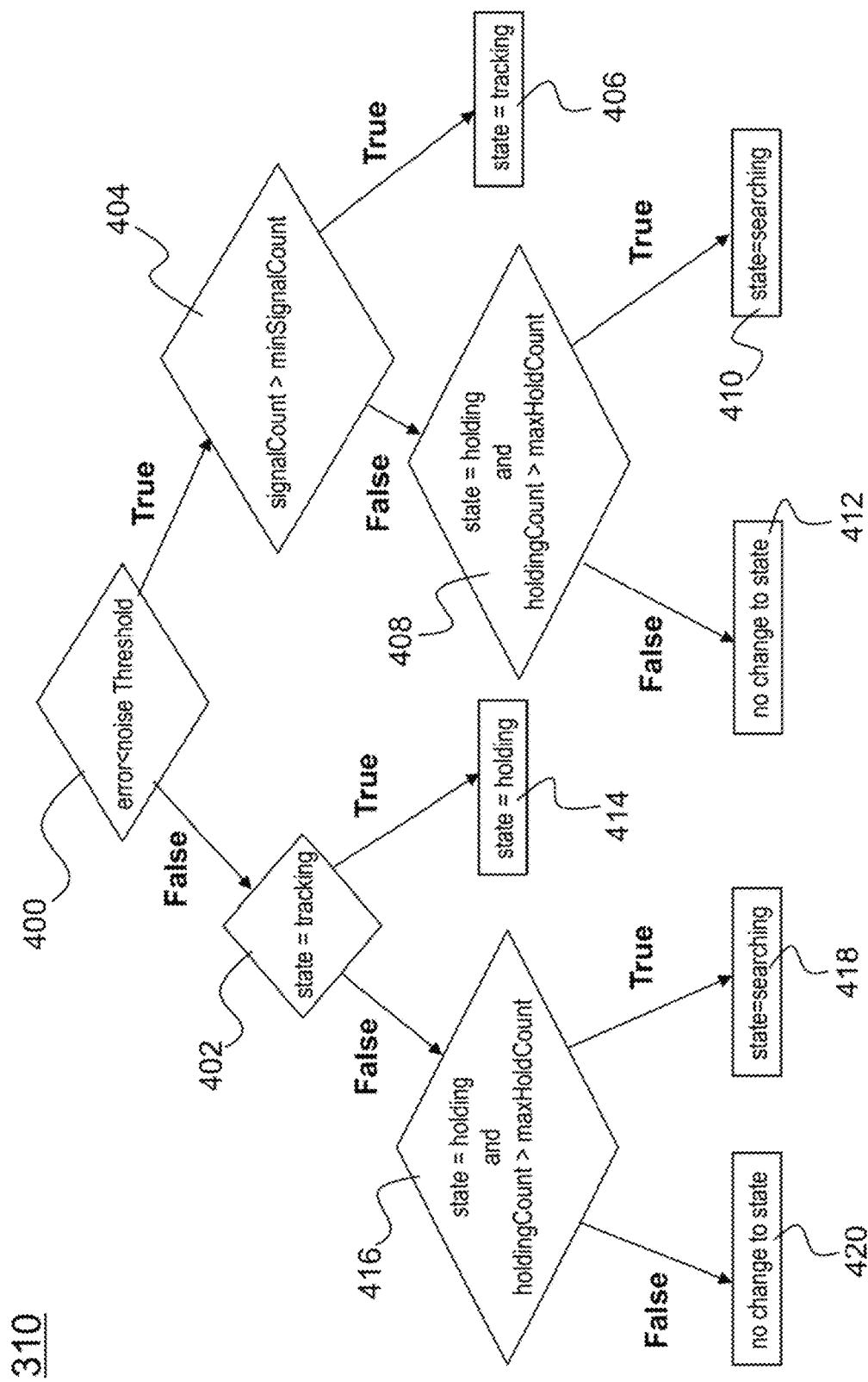
FIG. 4 is an illustration of the filter state controller according to some embodiments of the present disclosure.

FIG. 4 depicts a diagram of the algorithm implemented by the Filter State Controller 310. It uses the error signals 308 derived from the filter outputs to update the filter states 312. error, state, signalCount, and holdingCount are filter-specific variables. noiseThreshold, minSignalCount, and maxHoldCount are fixed numeric parameters that are the same for every filter and are set by the user. A filter may be in one of three possible states: searching, tracking, and holding. The variables holdingCount and signalCount are specific to each filter. The user-specified parameters noiseThreshold, maxHoldCount, and minSignalCount are fixed.

First, the presence or absence of a signal with respect to a given filter is determined by thresholding the error signal, which is defined as the normalized negative power of the filter output. In the presence of signal the value of this measure will drop below a pre-defined threshold. The threshold (noiseThreshold) is determined by observing the value under pure noise. If the error signal is below the threshold (element 400), it means that the filter is detecting a source signal. Otherwise, the filter's state is set to "tracking" (element 402). The signalCount variable is the number of consecutive time-steps that the filter's error signal has been below the threshold. If signalCount is greater than the parameter minSignalCount (element 404), then the filter's state is set to "tracking" (element 406), because there is confidence that an actual signal is being observed, not just noise. Otherwise, if the filter's state is "holding" and the variable holdingCount is greater than the parameter maxHoldCount (element 408), then the filter's state is set to "searching" (element 410). If this is false, then no change is made to the filter's state (element 412). The variable holdingCount is the number of consecutive time-steps that the filter has been in the "holding" state. It is used to limit the amount of time that a filter can spend in this state. If the error signal rises above noiseThreshold and the filter is in the "tracking" state (element 402), then it transitions to the "holding" state (element 414). On the other hand, if it is already in the "holding" state and holdingCount is greater than maxHoldCount (element 416), the filter transitions back to the "searching" state (element 418). Otherwise, no change is made to the filter's state (element 420).

(3.5) Filter Center Frequency Adapter (Element 314)

The Filter Center Frequency Adapter 314 is responsible for updating the positions of the filters in the frequency domain by utilizing the error signals 308 and filter states 312. In addition to adapting the filters, it implements two important capabilities. First, it prevents more than one filter from extracting any given source signal 306 at the same time. Second, it ensures that a filter is able to track a source signal 306 for the duration of at least a single pulse. This way, no pulses that are extracted from the mixture signal 300 are split between different filter outputs.

The first capability is implemented by allowing each filter to set-up a protected region when it is in the process of extracting a signal. The protected region is an interval in the frequency domain that is centered on a filter's center frequency. The center frequency of a filter is not permitted to exist within another filter's protected region. A general policy governing the resolution of conflicts that arise when a filter attempts to move within another filter's protected region is not prescribed since such a policy is necessarily dependent on the specifics of the center frequency adaptation algorithm. However, an effective scheme for a proven embodiment is described.

Figure 5:
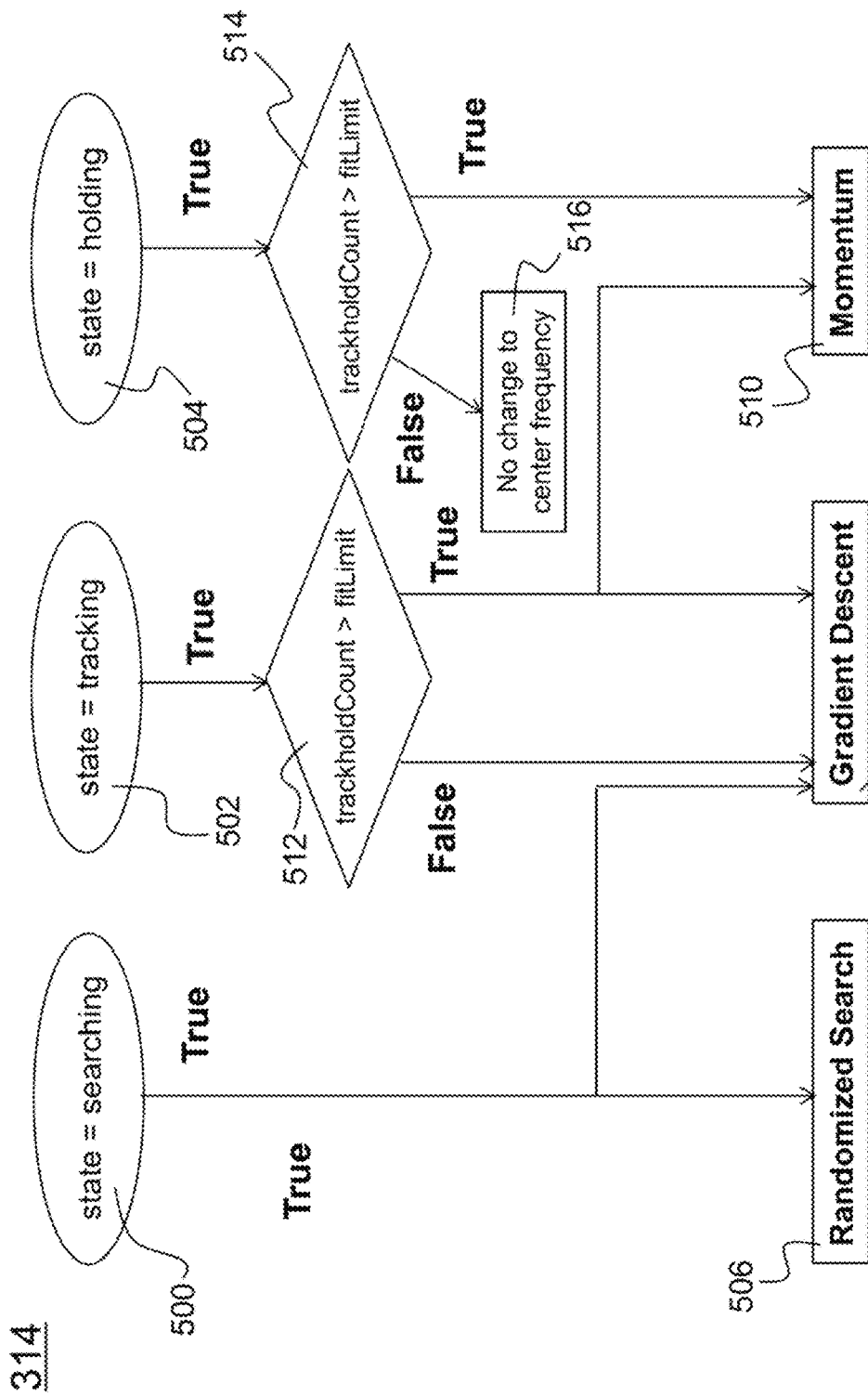
FIG. 5 is an illustration of the filter center frequency adapter according to some embodiments of the present disclosure.

As shown in FIG. 5, the second capability is implemented by allowing each filter to exist in one of three states. These states are named searching (element 500), tracking (element 502), and holding (element 504). In the searching state 500, a filter's center frequency moves freely across the bandwidth as it searches for a source signal. Once a filter has honed in on a source signal it enters the tracking state 502, and the filters protected region is set. If, during the tracking state, a filter loses the signal it was tracking, then it will enter the holding state 504. In the holding state 504, a filter is held at its current center frequency for a fixed period of time $\Delta T$ and the filter's protected region remains in place. If, during this period of time, a signal returns, then the filter is switched back to the tracking state 502. On the other hand, if after time $\Delta T$ no signal has returned, then the filter is switched to the searching state 500 and its protected region is removed.

FIG. 5 depicts a diagram of the algorithm that the Filter Center Frequency Adapter 314 implements. It integrates three adaptation methods that operate together or in isolation: Randomized Search 506, Gradient Descent 508, and Momentum 510. The choice of adaptation method is dictated by a filter's state and the duration that the filter has been tracking a signal. trackholdCount is a filter-specific variable. fitLimit is a fixed numeric parameter that is the same for every filter and is set by the user. As described above, a filter may be in one of three possible states: searching (element 500), tracking (element 502), and holding (element 504). There are three distinct methods that select new center frequencies. In Randomized Search 506 a pre-defined number of center frequencies are drawn randomly from a unimodal distribution, such as a Gaussian. The standard deviation of the distribution is fixed and the mean is always set to the current center frequency of the filter for which the samples are being drawn.

A filter is instantiated for each of these frequencies, and the error of each filter is computed on the current block of the mixture signal 300. The center frequency that produced the lowest error is selected. Gradient Descent 508 may refer to any type of gradient descent algorithm. In one embodiment, Stochastic Gradient Descent and Resilient Propagation (RProp) (Literature Reference No. 4) was used. These algorithms update the center frequency by taking a step approximately in the direction opposite the gradient of the error function located at the current center frequency. The Momentum 510 method updates the center frequency by fitting a linear function to some number of past center frequencies and then extrapolating this linear model to the next time-step.

In experimental studies, two variants of the Momentum 510 method were successfully used. In the first variant, the linear function is fit over the most recent series of N past frequencies using least-squares linear regression. In the second, and simpler, variant the linear function is fit by using the most recent frequency and the frequency that occurred a pre-defined number of time-steps T in the past. It is important that N or T be large enough that a sufficiently accurate trend is captured by the linear fit. However, N or T should be small enough that the linear fit does not incorporate frequency sequences that occurred while a filter was tracking multiple different source signals. Furthermore, if the rate of change of the frequency of a source signal is not constant, one must avoid setting N or T too large.

According to FIG. 5, if the filter state is searching (element 500), then both Randomized Search 506 and Gradient Descent 508 are used. The center frequency with the lowest associated error from either method is selected. If the filter state is tracking (element 502) and the variable trackholdCount is greater than the user-specified parameter fitLimit (element 512), then both Gradient Descent 508 and Momentum 510 are used to determine the next center frequency. Otherwise, only Gradient Descent 508 is used. The variable trackholdCount is the number of consecutive time-steps that the filter has been in either the tracking or the holding state. The condition trackholdCount>fitLimit (element 514) allows only those filters that have been tracking a source signal sufficiently long to use the Momentum 510 method.

If the suggested next center frequency produced by Gradient Descent 508 is $f_g$ and that suggested by Momentum 510 is $f_m$, then the next center frequency is given by $f_{new}=c_1*f_g+c_2*f_m$, where $c_1$ and $c_2$ are positive constants such that $c_1+c_2=1$. If $c_1>c_2$, then there is more emphasis on the portion of the mixture signal that the filter is currently seeing, while if $c_2>c_1$, then the linear trend of past center frequencies play a stronger role in determining the new frequency. Typically, $c_1=c_2=0.5$ is used. If the filter state is holding and trackholdCount>fitLimit (element 514), then sufficient signal tracking has been performed to utilize Momentum 510 to update the center frequency, but a signal is not currently being tracked and, thus, Gradient Descent 508 is not used. Otherwise, there is no change to the filter center frequency (element 516).

(3.6) Experimental Studies

The following describes a non-limiting implementation of the system described herein and its application to two challenging, realistic blind source separation scenarios. The results of applying the invention described herein to these problems demonstrate its effectiveness.

The table in FIG. 6 shows the commonly used parameter values for an embodiment of the system according to embodiments of the present disclosure. Bessel filters were chosen, which have a unimodal frequency gain response as required by the invention. Furthermore, it is efficient to instantiate this type of filter because its coefficients can be expressed analytically as a function of the (variable) center frequency and (fixed) bandwidth. RProp was used for Gradient Descent 508, a Gaussian distribution for Randomized Search 506, and a linear fit based on two center frequencies for Momentum 510. In case any of the center frequencies suggested by Randomized Search 506, RProp, or Momentum 510 were negative, the absolute value was taken.

The first challenging problem had a noisy mixture signal that consisted of many diverse linearly mixed source signals. This scenario represents an extremely clustered signal environment. It contained 80 short pulses and 1 long pulse contained within an ultra-wide 30 GHz bandwidth. With the exception of the long pulse, which spanned the duration of the signal, the maximum duration of the pulses was only 100 nanoseconds. This short duration made detecting and extracting the pulses more challenging. Furthermore, to make extracting the pulses even more difficult, the scenario was set up such that 80% of the pulses overlapped at least one other pulse. The pulses had a wide range of modulations, including various Barker codings, chirps with different rates, amplitudes with different shaped envelopes, and a variety of durations. The mixture signal, which is depicted in the plot in FIG. 7A, had a 12 decibel (dB) signal-to-noise ratio and contained 36 pulses below the noise floor. The mixture signal depicted in FIG. 7A was the input to the adaptive blind source separator 700 described herein.

FIG. 7B is a plot illustrating the extracted source signals output by the adaptive blind source separator 700. To extract the source signals (pulses) from the mixture, the adaptive blind source separator used 5 Bessel filters. The Momentum 510 method used the two-point linear fit. The extracted pulses are color-coded by the filter that tracked it. This is a very challenging cluttered signal environment including a wide range of pulse modulations and characteristics. The adaptive blind source separator 700 according to embodiments of the present disclosure was capable of extracting most of the primary pulses and even many of the secondary pulses that were below the noise floor.

FIG. 8 is a plot showing the center frequencies of the filters during the extraction process, which are color coded by filter. When a filter begins tracking a signal its center frequency follows the short-term frequency of the signal it is tracking. When a filter is not tracking a signal its center frequency is shown as 0 for the sake of clarity. For example, the frequency trace of the "green" filter shows that it was tracking the lone long pulse that spanned much of the duration of the input signal. The ultra-wide 30 GHz (gigahertz) bandwidth is clear in FIG. 8.

The results displayed in FIGS. 7B and 8 provide qualitative confirmation that the system according to embodiments of the present disclosure is able to extract most of the pulses from the mixture signal. Specifically, the invention described herein extracted 43 of the 45 pulses that were above the noise floor, and was even able to extract 17 of the 36 pulses that were below the noise floor, which is extremely difficult for state-of-the-art blind source separation methods.

FIG. 9 quantifies the performance of the system described herein on this challenging scenario. The x-axis is the signal-to-noise ratio (SNR) of the pulses in an 80 MHz (megahertz) bandwidth and the y-axis is the relative frequency with which pulses occur at a given SNR. The dashed line 900 represents pulses that the system detected, and the solid line 902 represents pulses that it missed. From FIG. 9, it can be seen that the system described herein missed only one pulse that was above the 12 dB noise floor and this occurred because the pulse overlapped substantially with another pulse in the time-frequency domain. It also extracted a large number of pulses below the noise floor and many of those that it missed had such low SNRs that it is not theoretically possible to extract them. In total, the system extracted 43 of the 45 primary pulses and 17 of the 36 secondary pulses that were below the noise floor. It becomes increasingly difficult to extract pulses as the SNR decreases.

The second challenging problem had a noisy mixture signal that consisted of two colliding parabolic chirp source signals. It is very difficult to detect and track signals such as these that have nonlinear frequency dynamics and collisions in the time-frequency domain. Most state-of-the-art blind source separation methods fail at this type of scenario. The mixture signal depicted in FIG. 10A consisted of two linearly mixed chirped pulses with quadratic chirp rates. The signal had 12 dB SNR. The adaptive blind source separator 700 used two Bessel filters to track the source signals. The Momentum 510 method used the two-point linear fit. FIG. 10B shows the filter output during adaptation. The adaptive blind source separator 700 extracted both chirps (shown in green and blue). The extracted pulses are color-coded by the filter that tracked it (green and blue). The system successfully tracked both parabolic chirps even through their collisions.

FIG. 11 is a plot depicting the center frequencies of the two filters while the mixture signal was fed as input. When a filter begins tracking a signal, its center frequency follows the short-term frequency of the signal it is tracking. When a filter is not tracking a signal, its center frequency is shown as 0 for the sake of clarity. Importantly, the invention described herein was able to track the chirps through their two collisions in the time-frequency domain. FIG. 11 clearly shows the parabolic frequency dynamics of the tracked chirps (i.e., solid 1100 and dashed lines 1102 representing two distinct filters). Other techniques would either lose both signals entirely or converge on a single signal after the collision.

In summary, described is a machine learning inspired adaptive system for blind source separation that permits low size, weight and power hardware implementations. Fusion of derivative-based (local) and randomized (global) parameter adaptation strategies provide both ultra-wide bandwidth coverage and rapid signal tracking. Integration of adaptive filtering and state-dependent filter behaviors achieve robust blind source separation in challenging realistic electronic warfare scenarios.

The system described herein is the first to leverage a hybrid gradient descent and randomized optimization scheme to adapt IIR filters with tunable center frequencies. It is also the first to use a combination of state-dependent filter behaviors and momentum to assure minimal redundancy in extracted source signals and consistent signal tracking in challenging real-world scenarios, such signal collisions in the time-frequency domain and temporary loss of signal, all requiring low memory and computational requirements. These innovations enable the system according to embodiments of the present disclosure to separate multiple temporally correlated source (radio frequency) RF signals over an ultra-wide bandwidth (>80 Ghz) using as little as a single antenna. The low complexity and memory requirements of the algorithms described herein enable the invention to be developed on low-power hardware, including finite programmable gate arrays (FPGAs) and custom digital application-specific integrated circuits (ASICs).

The system according to embodiments of the present disclosure is directly applicable to systems that can perform real-time processing of signals over an ultra-wide bandwidth (>30 Ghz). In such applications, fast detection of source signals is very important for gaining real-time situational awareness and response. The Adaptive Blind Source Separator approach described herein is also applicable to vehicle applications, such as rapid detection and separation of obstacles from clutter from radar antenna signals.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for blind source separation, the system comprising:
    one or more processors and a non-transitory computer-readable medium having executable instructions encoded thereon such that when executed, the one or more processors perform operations of:
        continuously passing a time-series of data points from one or more mixtures of source signals through a plurality of adaptable filters having center frequencies, resulting in a plurality of output signals, each filter in the plurality of adaptable filters having a corresponding output signal;
        determining an error of each output signal, resulting in a set of error signals;
        determining a filter state of each filter using the error signals, resulting in a set of filter states;
        adapting a set of filter center frequencies with a filter center frequency adapter by receiving and using both the set of error signals and the set of filter states, resulting in new filter center frequencies;
        updating the set of filter center frequencies with the new filter center frequencies; and
        extracting separated source signals from the mixture of signals.

2. The system as set forth in claim 1, wherein the plurality of filters are low-order adaptable infinite impulse (IIR) filters.

3. The system as set forth in claim 1, wherein the error is a negative power of the output signal, and wherein the separated source signals are extracted by minimizing the negative power of each filter's output signal.

4. The system as set forth in claim 1, wherein, as the one or more mixtures of source signals is passed through each filter, each filter adapts such that its filter center frequency converges on a filter center frequency of a separated source signal.

5. The system as set forth in claim 1, wherein the filter center frequency adapter prevents more than one filter from extracting any given source signal at the same time.

6. The system as set forth in claim 1, wherein the filter center frequency adapter integrates a plurality of adaptation methods that operate together or alone to select new filter center frequencies, wherein an adaptation method in the plurality of adaptation methods is selected based on a filter's state.

7. A computer program product for blind source separation, the computer program product comprising:
    a non-transitory computer-readable medium having executable instructions encoded thereon, such that upon execution of the instructions by one or more processors, the one or more processors perform operations of:
        continuously passing a time-series of data points from one or more mixtures of source signals through a plurality of adaptable filters having center frequencies, resulting in a plurality of output signals, each filter in the plurality of adaptable filters having a corresponding output signal;
        determining an error of each output signal, resulting in a set of error signals;
        determining a filter state of each filter using the error signals, resulting in a set of filter states;
        adapting a set of filter center frequencies with a filter center frequency adapter by receiving and using both the set of error signals and the set of filter states, resulting in new filter center frequencies;
        updating the set of filter center frequencies with the new filter center frequencies; and
        extracting separated source signals from the mixture of signals.

8. The computer program product as set forth in claim 7, wherein the plurality of filters are low-order adaptable infinite impulse (IIR) filters.

9. The computer program product as set forth in claim 7, wherein the error is a negative power of the output signal, and wherein the separated source signals are extracted by minimizing the negative power of each filter's output signal.

10. The computer program product as set forth in claim 7, wherein, as the one or more mixtures of source signals is passed through each filter, each filter adapts such that its filter center frequency converges on a filter center frequency of a separated source signal.

11. The computer program product as set forth in claim 7, wherein the filter center frequency adapter prevents more than one filter from extracting any given source signal at the same time.

12. The computer program product as set forth in claim 7, wherein the filter center frequency adapter integrates a plurality of adaptation methods that operate together or alone to select new filter center frequencies, wherein an adaptation method in the plurality of adaptation methods is selected based on a filter's state.

13. A computer implemented method for blind source separation, the method comprising an act of:
    causing one or more processors to execute instructions encoded on a non-transitory computer-readable medium, such that upon execution, the one or more processors perform operations of:
        continuously passing a time-series of data points from one or more mixtures of source signals through a plurality of adaptable filters having center frequencies, resulting in a plurality of output signals, each filter in the plurality of adaptable filters having a corresponding output signal;
        determining an error of each output signal, resulting in a set of error signals;
        determining a filter state of each filter using the error signals, resulting in a set of filter states;
        adapting a set of filter center frequencies with a filter center frequency adapter by receiving and using both the set of error signals and the set of filter states, resulting in new filter center frequencies;
        updating the set of filter center frequencies with the new filter center frequencies; and
        extracting separated source signals from the mixture of signals.

14. The method as set forth in claim 13, wherein the plurality of filters are low-order adaptable infinite impulse (IIR) filters.

15. The method as set forth in claim 13, wherein the error is a negative power of the output signal, and wherein the separated source signals are extracted by minimizing the negative power of each filter's output signal.

16. The method as set forth in claim 13, wherein, as the one or more mixtures of source signals is passed through each filter, each filter adapts such that its filter center frequency converges on a filter center frequency of a separated source signal.

17. The method as set forth in claim 13, wherein the filter center frequency adapter prevents more than one filter from extracting any given source signal at the same time.

18. The method as set forth in claim 13, wherein the filter center frequency adapter integrates a plurality of adaptation methods that operate together or alone to select new filter center frequencies, wherein an adaptation method in the plurality of adaptation methods is selected based on a filter's state.

* * * * *